United States Patent
Park et al.

(10) Patent No.: US 9,440,701 B2
(45) Date of Patent: Sep. 13, 2016

(54) BODY FRAME FOR BICYCLE

(71) Applicant: WIN & WIN Co., Ltd., Anseong (KR)

(72) Inventors: Dong Won Park, Seoul (KR); Ung Je Choi, Anseong (KR); Chang Ho Yi, Incheon (KR)

(73) Assignee: WIN & WIN CO., LTD., Anseong (KR)

( * ) Notice: Subject to any disclaimer, the term of this patent is extended or adjusted under 35 U.S.C. 154(b) by 0 days.

(21) Appl. No.: 14/719,143

(22) Filed: May 21, 2015

(65) Prior Publication Data

US 2015/0344096 A1    Dec. 3, 2015

(30) Foreign Application Priority Data

May 27, 2014  (KR) ........................ 10-2014-0063515

(51) Int. Cl.
| | |
|---|---|
| B62K 19/16 | (2006.01) |
| B62K 3/02 | (2006.01) |
| B62K 19/22 | (2006.01) |
| B62K 19/28 | (2006.01) |

(52) U.S. Cl.
CPC ............... B62K 19/16 (2013.01); B62K 3/02 (2013.01); B62K 19/22 (2013.01); B62K 19/28 (2013.01)

(58) Field of Classification Search
CPC ................................. B62K 3/02; B62K 19/16
USPC ........................................................ 280/281.1
See application file for complete search history.

(56) References Cited

U.S. PATENT DOCUMENTS

| | | | |
|---|---|---|---|
| 5,059,057 A * | 10/1991 | Graef | A61F 2/28 403/292 |
| 5,857,690 A * | 1/1999 | Gueugneaud | B29C 33/308 280/281.1 |
| 6,012,733 A | 1/2000 | Rafoth | |
| 7,574,074 B1 | 8/2009 | Huang | |
| 7,793,959 B2 | 9/2010 | Vandermark | |
| 2006/0038375 A1* | 2/2006 | Parkin | B62K 19/16 280/274 |
| 2007/0222178 A1* | 9/2007 | Davis | B62K 19/16 280/281.1 |
| 2008/0018075 A1 | 1/2008 | Yu | |

FOREIGN PATENT DOCUMENTS

| | | | | |
|---|---|---|---|---|
| JP | KR 20120028549 A * | 3/2012 | ............... | B32B 1/08 |
| KR | 1994-0008585 B1 | 9/1994 | | |
| KR | 20-0163166 Y1 | 12/1999 | | |
| KR | 10-2007-0010027 A | 1/2007 | | |
| KR | 10-0938175 B1 | 1/2010 | | |
| KR | 10-2011-0037715 A | 4/2011 | | |
| KR | 10-2012-0028549 A | 3/2012 | | |
| KR | 10-1337593 B1 | 12/2013 | | |

* cited by examiner

*Primary Examiner* — Kevin Hurley
*Assistant Examiner* — Felicia L Brittman

(57) ABSTRACT

Disclosed is a frame body for a bicycle which is able to provide higher strength and reduce the weight of the body frame in such a way to use a carbon material even when the outer diameters of a top tube and a bottom tube are thinner same as the thickness of the tubes forming a classical type body frame. In the body frame for a bicycle, at least one tube among the top tube, the bottom tube and the seat tube is made of a carbon material outer tube of a pipe shape the diameter of which is same from one end to the other end, and an inner tube made of a carbon material in a tubular shape and having a cross section area smaller than the cross section area of the outer tube is fixedly installed in the inside of a predetermined section of the outer tube.

15 Claims, 5 Drawing Sheets

BODY FRAME FOR BICYCLE

TECHNICAL FIELD

The present invention relates to a body frame for a bicycle, and in particular to a body frame for a bicycle which is able to provide higher strength and reduce the weight of the body frame in such a way to use a carbon material even when the outer diameters of a top tube, a bottom tube, and a seat tube, etc. are thinner same as the thickness of the tubes forming the body frame in a classical type bicycle.

BACKGROUND ART

A bicycle, which is used as one of land transportation means, is basically driven by a user's driving force, so it is very useful in terms of environment pollution prevention and energy saving. The bicycle may contribute to enhancing a user's physical strength, so the bicycle is very popular since it can used as a leisure activity tool. More specifically, the bicycle may be used as a transportation means and a sport or leisure tool. Such a bicycle may be categorized into many different types based on the purpose of use, structure, material, driving principle, etc.

In terms of the purpose of use, the bicycle may be categorized into a common type, a racing type, a MTB type, a leisure type, etc. In case of the common type, the bicycle may be categorized into a bicycle for one user, a bicycle for two or more than two users, and a bicycle for freight.

In terms of the structure, the bicycle may be categorized into various types based on the reference of categorization. For example, the bicycle may be categorized into a folding bicycle and a non-folding bicycle based on the presence of a foldable body.

In addition, the bicycle may be categorized based on the materials of the body frame, for example, a cold-rolled steel plate, a stainless steel, a chrome-molybdenum steel, aluminum, titanium, magnesium, a carbon fiber, etc. In particular, the weight of the material of the body frame accounts for almost the total weight of the bicycle. For example, assuming that the inclusion ratio of the chrome-molybdenum steel is 100, the ratio of titanium is 50, the ratio of aluminum is 34, and the ratio of carbon is 18, which means that the bicycle having a body frame made of a carbon material is lighter than the bicycle made of other materials.

As mentioned above, the bicycle may be categorized into a variety of types based on the reference of categorization. For the sake of easier understanding of the present invention, the bicycle may be categorized into a classical type bicycle and a modern type bicycle based on the outer appearance of the body frame. Throughout the descriptions of the present invention, the bicycle will be roughly categorized into a classical type bicycle wherein a head tube, a top tube, a bottom tube, a seat tube, a rear tube, a chain tube, etc. which are all belonging to the body frame of the bicycle are made of circular pipes, and the connection portions of each tube are welded or connected using a separate connection member, and a modern type bicycle wherein the diameter or thickness of each tube belonging to the body frame is relatively larger or thicker than each of the tubes of the classical bicycle, and each tube is configured in a variety of designs, not in a circular pipe shape. This categorization is made based on the facts that the body frame of the classical bicycle is mainly made of metallic circular pipes wherein iron is contained as a main composition, and the body frame of the modern style bicycle is mainly made of new materials, for example, a carbon material, based on the purpose of use, so the modern style bicycle can be made in various designs.

FIG. 1 is a view illustrating an example of a conventional classical type bicycle 10. There are provided a top tube 12, a bottom tube 13, a seat tube 14, etc. which form a body frame 11. The diameters of such tubes may be minutely different, but they are mainly made of circular pipes. Such a classical type bicycle is being used as a common type or racing type bicycle rather than a MTB or leisure type bicycle. In particular, the bicycle wherein the body frame 11 is made of a metallic material, for example, steel, aluminum, etc. used as a main composition.

FIG. 2 is a view illustrating an example of the conventional modern type bicycle 20. The top tube 22, the bottom tube 23, the seat tube 24, etc. which form the body frame 21 have different thicknesses. Such tubes all are integrally molded or partially molded and are assembled through a separate assembling process rather than the tubes are manufactured by connecting circular pipes. In particular, the above modern type bicycle mainly corresponds to the MTB or leisure bicycle wherein the body frame 21 is made of a carbon material.

As illustrated in FIGS. 1 and 2, the classical type bicycle 10 and the modern type bicycle 20 have key differences in the outer diameters (or thicknesses) of each tube belonging to the body frames 11 and 21. More specifically, each of the tubes 12, 13 and 14 of the classical type bicycle 10 have relatively smaller outer diameters (or thicknesses) as compared with the tubes 22, 23 and 24 of the modern type bicycle 20. Since the body frame 11 of the classical type bicycle 10 is made of metallic circular pipes, even when the diameters are large, the strengths are high, whereas the body frame 21 of the modern type bicycle 20 is mainly manufactured through the molding process by using a carbon material, so the outer diameters (or thicknesses) should be relatively larger so as to secure enough strength.

Of course, the reason why the tubes 22, 23 and 24 of the body frame 21 of the modern type bicycle 20 are made thicker is not because of their materials. Such tubes should be made thicker in an effort to provide more active, strong and stylus impressions when designing the MTB or leisure bicycle.

Meanwhile, as illustrated in FIG. 1, a top tube 12 and a bottom tube 13 are formed in a triangular shape and about a seat tube 14 at a front end of the body frame of the classical type bicycle, and a rear tube 15 and a chain tube 16 are formed in a triangular shape at a rear end thereof, which consequently looks like a diamond shape. In such a body frame 11, relatively more torsion stress may concentrate at a front portion 12a of the top tube 12, a front portion 13a of the bottom tube 13, a lower portion of the seat tube 14, etc while a user is riding the bicycle. As illustrated in FIG. 2, a front portion 22a of the top tube 22, a front portion 23a of the bottom tube 23, and a lower portion of the seat tube 24 are made relatively thicker in the body frame of the morn type bicycle.

Since the classical type bicycle in general is made by connecting circular metallic pipes, the tubes belonging to the body frame has roughly same outer diameters at the front and rear portions (or upper and lower portions). In addition, in case of the modern type bicycle wherein the body frame is made using a carbon material, since it is easy to make different the thicknesses of the front and rear portions (or upper and lower portions) of the tubes, the body frames can be manufactured in various designs.

So far, there has not been any trial to make a frame body of a bicycle using a carbon material while maintaining a traditional design of tubes belonging to the body frame of the bicycle. In addition, since the main frame of the classical type bicycle is made of metals, the weight is very heavy, so it is hard for the user to handle it.

PRIOR ART DOCUMENTS

Patent Documents (Patent Document 0001) Korean Patent Registration No. 10-13375933333
(Patent Document 0002) Korean Patent Publication No. 10-2012-0028549
(Patent Document 0003) Korean Patent Publication No. 1994-0008585
(Patent Document 0004) Korean Utility Model Registration No. 20-0163166
(Patent Document 0005) Korean Patent Registration No. 10-0938175
(Patent Document 0006) U.S. Pat. No. 6,012,733
(Patent Document 0007) U.S. Pat. No. 7,574,074
(Patent Document 0008) U.S. Pat. No. 7,793,959

DISCLOSURE OF THE INVENTION

Accordingly, it is an object of the present invention to provide a body frame for a bicycle which is able to provide higher strength and reduce the weight of the body frame in such a way to use a carbon material even when the outer diameters of a top tube, a bottom tube, and a seat tube, etc. are thinner same as the thickness of the tubes forming the body frame in a classical type bicycle.

It is another object of the present invention to provide a body frame for a bicycle which makes it possible to greatly reduce the total weight of a bicycle, while maintaining an outer appearance of a traditional style bicycle which has been mainly manufactured using a metallic material.

It is further another object of the present invention to provide a body frame for a bicycle which can more reinforce the portions, for example, at a top tube, a bottom tube, a seat tube, etc. all forming the body frame of a bicycle, where torsion stress concentrates.

To achieve the above objects, the present invention may be configured in the following way.

In the body frame for a bicycle which includes the top tube, the bottom tube and the seat tube, at least one tube among the top tube, the bottom tube and the seat tube is made of a carbon material outer tube of a pipe shape the diameter of which is same from one end to the other end, and an inner tube made of a carbon material in a tubular shape and having a cross section area smaller than the cross section area of the outer tube is fixedly installed in the inside of the whole sections or a predetermined section of the outer tube.

In the body frame for a bicycle according to the present invention, the inner tube is formed in a shape of a circular pipe the outer surface of which contacts with the inner surface of the outer tube.

In the body frame for a bicycle of the present invention, the inner tube has a polygonal cross section which contacts at multiple portions and at regular intervals and with the inner surface of the outer tube.

In the body frame for a bicycle of the present invention, the inner tube is formed of three or four pipes in tubular shapes the outer diameter of which are smaller than the inner diameter of the outer tube.

In the body frame for a bicycle of the present invention, the inner tube is formed in a structure wherein the inner tube is formed in multiple triangular shapes or multiple quadrangular shapes the side of each of which is smaller than the inner diameter of the outer tube, so the inner tube is adhered at regular intervals to the inner surface of the outer tube.

In the body frame for a bicycle, the outer diameter of the outer tube is in a scope of 15 mm to 35 mm.

In the body frame for a bicycle, the inner diameter of the outer tube gradually or step by step decreases from one end to the other end.

ADVANTAGEOUS EFFECTS

According to the body frame for a bicycle according to the present invention, the top tube, the bottom tube and the seat tube belonging to the body frame similar with the conventional classical type body frame for a bicycle are formed in a shape of a circular pipe having the same outer diameters from a front end (or top) to a rear end(or bottom), and compared with the top tube, the bottom tube and the seat tube belonging to the body frame for a classical type bicycle, even though the outer diameters of each tube are similar with each other, each tube is made of a carbon material, so it is possible to manufacture a bicycle relatively lighter than a conventional classical type bicycle.

In addition, the body frame for a bicycle according to the present invention is advantageous in the way that the stability of the whole structure can be secured in such a way that the portions where torsion stress concentrates can be reinforced, while maintaining an outer appearance of the body frame of classical type bicycle.

In particular, the body frame for a bicycle according to the present invention may change the long term paradigm where the body frame for a classical type bicycle should be made of only metal materials.

BRIEF DESCRIPTION OF THE DRAWINGS

The present invention will become better understood with reference to the accompanying drawings which are given only by way of illustration and thus are not limitative of the present invention, wherein.

MODES FOR CARRYING OUT THE INVENTION

Figure 1:
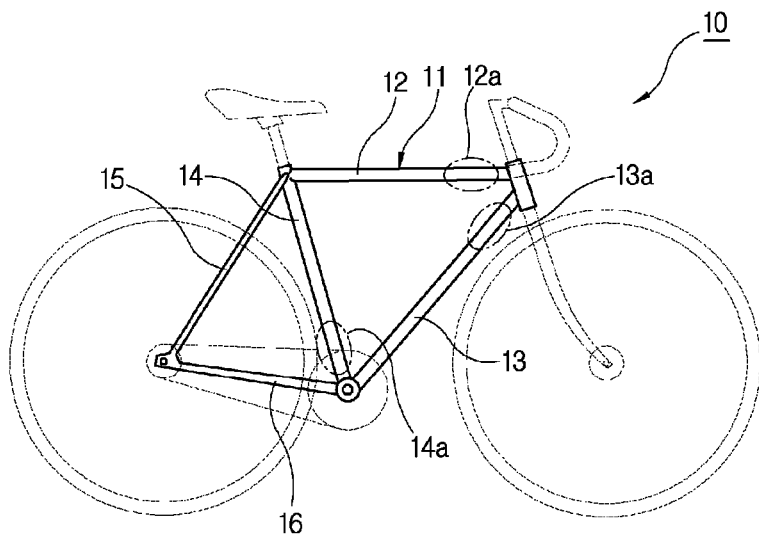
FIG. 1 is a view for describing a configuration of a conventional classical type bicycle.
Figure 2:
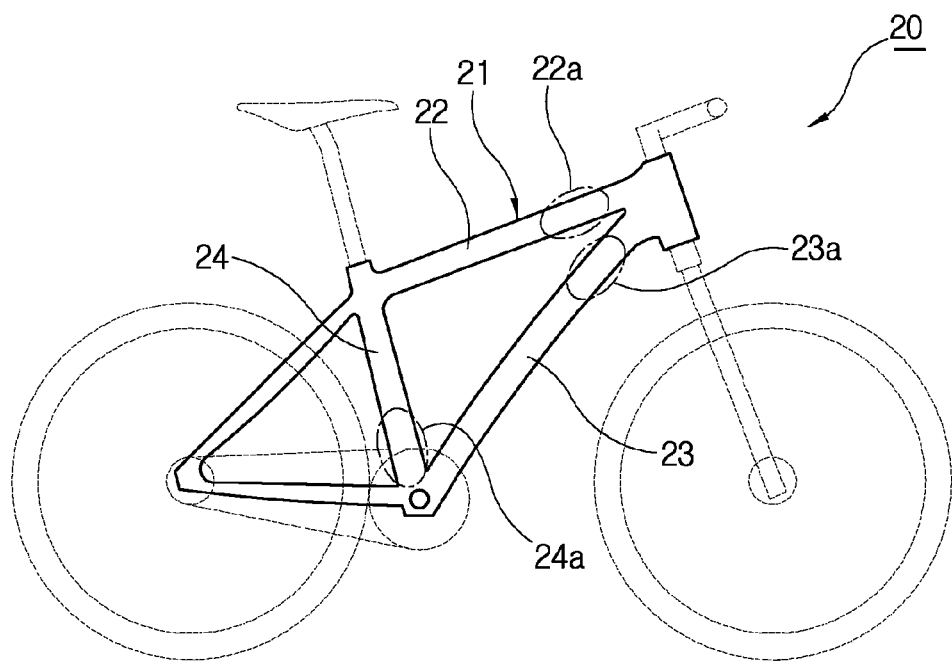
FIG. 2 is a view for describing a configuration of a conventional modern type bicycle.

The exemplary embodiments of the body frame for a bicycle according to the present invention will be described with reference to the accompanying drawings. In the drawings, reference number 100 represents a body frame according to an exemplary embodiment of the present invention.

Figure 3:
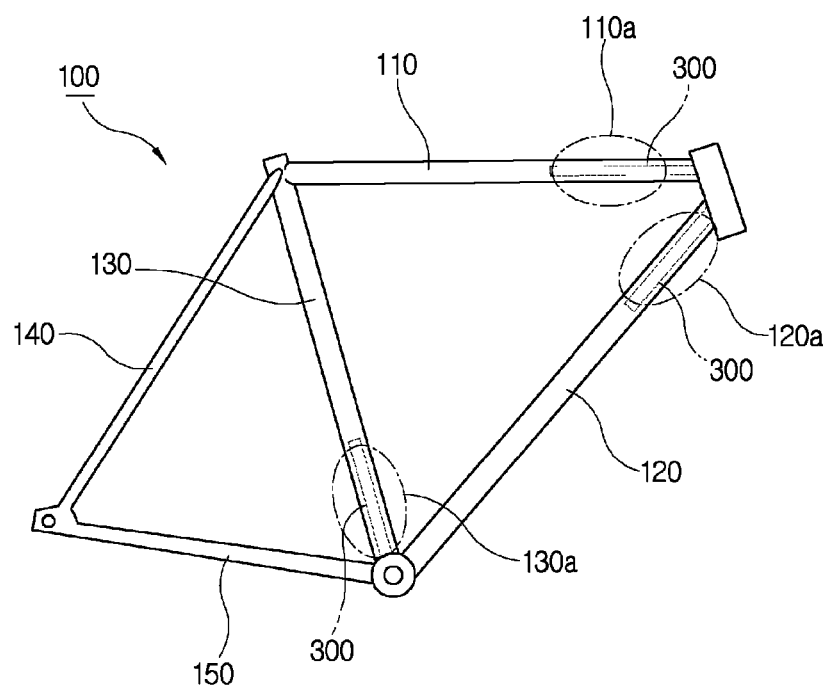
FIG. 3 is a view for describing a configuration of a body frame for a bicycle according to an exemplary embodiment of the present invention.

As illustrated in FIG. 3, the body frame 100 of the present invention includes a top tube 110, a bottom tube 120 and a seat tube 130 which are aligned in a triangular shape. The tubes 110, 120 and 130 can apply to a classical bicycle which has a pipe shape wherein the outer diameters of the tubes 110, 120 and 130 are same from the front ends (or tops) to the rear ends (or bottoms). In particular, the top tube 110, the bottom tube 120, and the seat tube 130 all are aligned to form a diamond shape, thus obtaining the outer appearance of the classical bicycle. In addition, the front end of the top tube 110 and the front end of the bottom tube 12 are integrally connected to the head tube (not illustrated in the drawing) which connects a handle and a fork.

The top tube 110 is aligned almost horizontal to have the outer appearance of the classical bicycle or the front end of the top tube 110 is aligned higher than the rear end, and the front end (top) of the bottom tube 120 has an acute angle with respect to the front end of the top tube 110, and the rear end (top) of the seat tube 130 is aligned to have an acute angle at the rear end of the top tube 110, and the rear end (bottom) of the bottom tube 120 is aligned to have an acute angle with respect to the front end (bottom) of the seat tube 130. Namely, the tubes belonging to the body frame 100 are aligned in such a way the top tube 110 and the bottom tube 120 are arranged in a triangular shape with respect to the seat tube 130, and the rear tube 140 and the chain tube 150 are arranged in a triangular shape, thus configuring the whole structures in a diamond shape which is similar with the conventional traditional bicycle.

In particular, the top tube 110, the bottom tube 120 and the seat tube 130 belonging to the body frame 100 for a bicycle according to an exemplary embodiment of the present invention are made of a carbon material. Therefore, different from the conventional modern type bicycle, the front ends (tops) to the rear ends (bottoms) of the tubes 110, 120 and 130 are formed in a circular pipe shape which has the same outer diameter. In addition, the thicknesses of the tubes 110, 120 and 130 all forming the body frame 100 are made thin same as the thicknesses of the tubes which apply to the conventional classical type bicycle.

The tubes 110, 120 and 130 all forming the body frame 10 which may apply to various embodiments of the present invention are formed in the circular pipe structure wherein the outer diameters thereof are in a scope of 15 mm to 35 mm so that the body frame can be recognized to look like the outer appearance of the body frame of the classical type bicycle. In particular, that the top tube 110, the bottom tube 120 and the seat tube 130 have the same outer diameters, so they may look more similar with the outer appearance of the classical type bicycle.

An inner tube 300 made of a carbon material may be further provided in the insides of all or at least one of the tubes 110, 120 and 130, thus allowing to secure more strength against external impact or distortion stress.

As illustrated in the drawings, in case of the top tube 110, the inner tube 300 is installed at the front end section 110a, and in case of the bottom tube 120, the inner tube 300 is installed at the front end section 120a, and in case of the seat tube 130, the inner tube 300 is installed at the lower end section 130a. Namely, as mentioned earlier, since the sections of each of the tubes 110, 120 and 130 relatively receive more distortion stress, it needs to reinforce strength if the diameters of the tubes are molded thinner using a carbon fiber or epoxy resin. For example, in case where the inner tube 300 of the present invention is installed at a specific section of the top tube 110, it is preferred that the inner tube 300 is positioned at the front end section 110a which corresponds to the front ¼ section in terms of length from the front end to the rear end if the section is divided into four parts. It is preferred that in case of the bottom tube 120, the inner tube 300 is installed at the front end section 120a corresponding to the front ¼ section in terms of length from the front end to the rear end, and in case of the seat tube 130, and the inner tube 300 is installed at the lower end section 130a corresponding to the lower end ¼ section in terms of length from the top end to the bottom end.

Hereinafter, the tubes where the inner tubes 300 are installed may be called "outer tubes" for convenience during descriptions.

The outer tube 200 which can apply to the top tube 110, the bottom tube 120 and the seat tube 130 all forming the body frame 100 for a bicycle according to an exemplary embodiment of the present invention is manufactured in a circular pipe shape the outer diameter of which is uniform, so it is possible to easily manufacture thanks to the simplified configuration as compared with each tube of the body frame which applies to the conventional modern type bicycle.

The procedure for manufacturing a carbon material into a pipe shape includes a process wherein a carbon sheet is stacked to a necessary thickness in a specified frame or mold and is pressurized at a predetermined temperature together with an epoxy resin, thus manufacturing a predetermined configuration. The method for molding a carbon sheet into pipes having triangular or quadrangular cross sections may use a conventional method for manufacturing a predetermined shaped tube using a carbon material.

Meanwhile, the outer tube 200 or the inner tube 300 according to an exemplary embodiment of the present invention are formed in a structure wherein the flesh thickness gets thicker from one end to the other end. Namely, during the procedure for molding a carbon tube by stacking carbon sheets, it is possible to set a predetermined flesh thickness in such away to adjust the number of laminations of carbon sheets, an arranged direction of carbon sheets, the thickness of carbon sheets and the thickness of resin.

In addition, in case of the inner tube 300 which is installed in the inside of the outer tube 200, since the cross sections are formed in tubular shapes, for example, a circular shape or a polygonal shape (triangular shape or quadrangular shape), it is relatively easy to manufacture, and mass production is available. In particular, since the structure of the inner tube 300 is simple, a preliminary manufacturing of the inner tube 300 which is necessary for the assembling to the outer tube 200 may become easier.

As mentioned earlier, the inner tube 300 of the present invention may be installed at the predetermined sections of the tubes 110, 120 and 130, where relatively more distortion stress concentrates, but it can be installed in all the sections from one end to the other end of each tube. The preferred portions where the inner tube 300, as illustrated in the drawings, is installed at the front ends in case of the top tube 110 and the bottom tube 120 where relatively more distortion stress concentrates, and in case of the seat tube, the inner tube 300 may be installed at the lower end portion. In addition, the inner tube 300 may be stalled in all the portions of each of the top tube 110, the bottom tube 120 and the seat tube 130. It may be installed at a predetermined tube or at two or more than two tubes.

Meanwhile, the previously prepared inner tube 300 may be inserted inside during the forming process of the outer tube 200. In addition, in a state where the inner tube 300 is assembled in the separately manufactured outer tube 200, they can be formed integrally by a predetermined adhering process.

Figure 4:
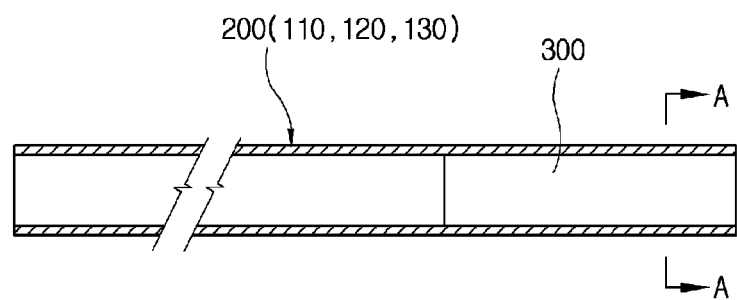
FIG. 4 is a cross sectional view illustrating an outer tube according to an exemplary embodiment of the present invention.
Figure 5:
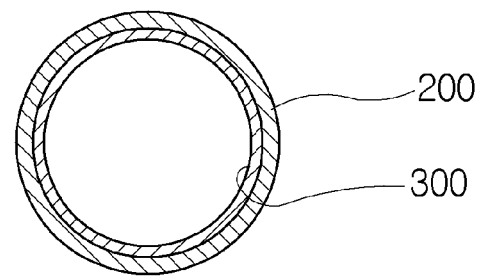
FIG. 5 is a cross sectional view taken along line A-A in FIG. 4.

FIG. 4 is a cross sectional view illustrating an outer tube 200 which may apply to the top tube 110, the bottom tube 120 or the seat tube 130 all forming the body frame 100 for a bicycle according to an exemplary embodiment of the present invention. FIG. 5 is a cross sectional view taken along line A-A in FIG. 4.

As illustrated in FIG. 5, an inner tube 300 with an outer diameter corresponding to the inner diameter of the outer tube 200 is further installed in the inside of the outer tube 200. Namely, the inner tube 300 which is made of a carbon material and has a circular cross section and is manufactured in a tubular shape, may be present inside the outer tube 200 during the molding process or the inner tube 30 may be assembled in the inside of the separately manufactured outer tube 200, the outer surface of the inner tube 300 contacting with the inner surface of the outer tube 200.

Figure 6:
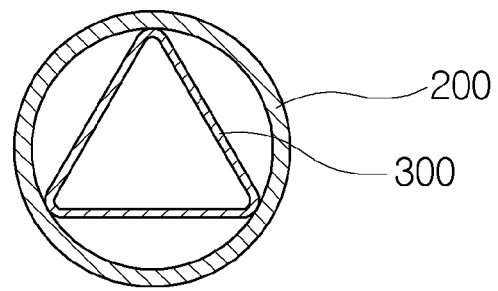
FIGS. 6 and 7 are cross sectional views illustrating an inner tube according to another exemplary embodiment of the present invention.
Figure 7:
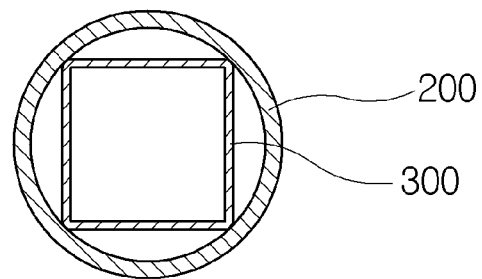

FIGS. 6 and 7 are views illustrating an occasion where the cross section of the inner tube 300 positioned in the inside of the outer tube is polygonal, wherein FIG. 6 is a view illustrating that the cross section of the inner tube 300 is triangular, and FIG. 7 is a view illustrating that the cross section of the inner tube 30 is quadrangular. As illustrated in FIG. 6, in case where the cross section of the inner tube 300 is triangular, the portion corresponding to the side of the triangle with respect to the inner surface of the outer tube does not contact, and the portions corresponding to the vertexes of the triangle contact. In case where the cross section of the inner tube 300 is triangular, the portion corresponding to the sides of the quadrangle with respect to the inner surface of the outer tube 200 does not contact, and the portion corresponding to the vertexes of the quadrangle contact.

Figure 8:
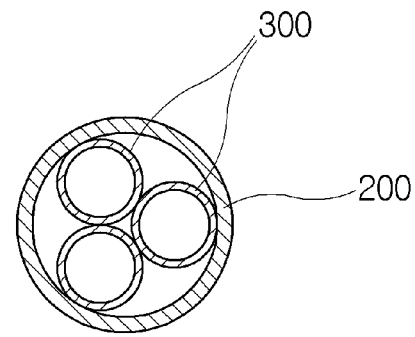
FIGS. 8 to 10 are cross sectional views illustrating an inner tube according to further another exemplary embodiment of the present invention.
Figure 9:
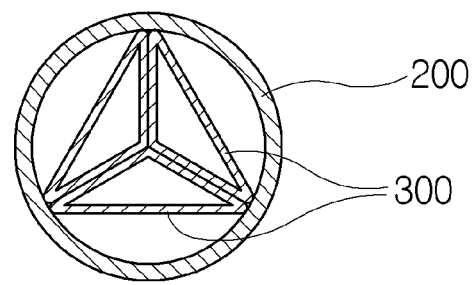
Figure 10:
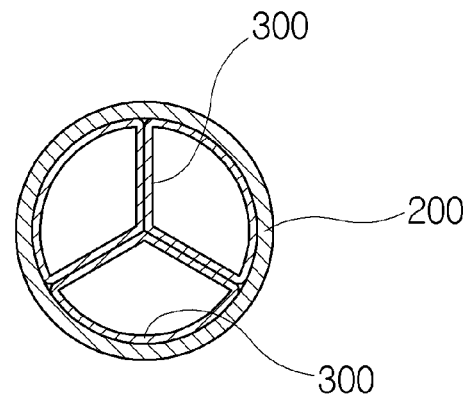

FIGS. 8 to 10 are views illustrating occasions where there are provided a plurality of inner tubes 300 installed in the inside of the outer tube 200.

First, as illustrated in FIG. 8, the cross sections of the plurality of the inner tubes 300 are circular, and since three inner tubes are arranged at regular intervals, there are linear contacts at regular intervals on the inner surface of the outer tube 200.

As illustrated in FIG. 9, the cross sections of the plurality of the inner tubes 300 are triangular, and there are surface contacts between the neighboring inner tubes 300, and there are linear contacts at two vertexes of the inner tubes 300 at three positions at intervals on the inner surface of the outer tube 200. Referring to FIG. 9, the inner tubes 300 are formed of three triangular tubes, and multiple triangular tubes or quadrangular tubes may be used.

FIG. 10 is a view illustrating an occasion where the cross sections of a plurality of inner tubes 300 installed in the inside of the outer tube 200 are formed in arc shapes. In case where the cross sections of the inner tubes 300 are formed in arc shapes, as seen in the drawings, in the inner surface of the outer tube 200, the curbed surface sections have surface contact, but the surfaces of the remaining two sides surface-contact with the surfaces of the neighboring inner tubes 300.

In addition, as not illustrated in the drawings, it is obvious that the inner tube 300 may be a tube with an octagonal cross section, a tube with a honey comb shape, a tube with a star-shaped cross section, etc.

Figure 11:
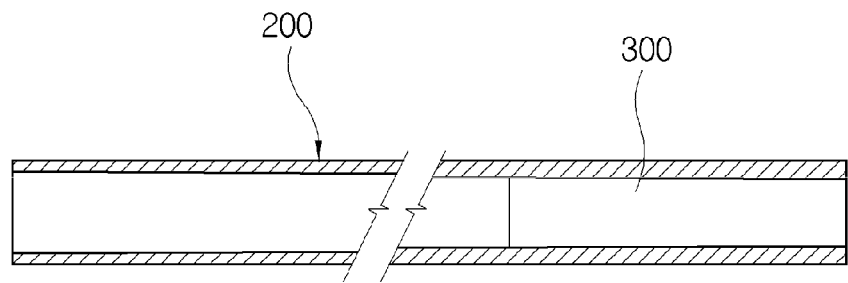
FIGS. 11 and 12 are views illustrating an outer tube according to further another exemplary embodiment of the present invention.
Figure 12:
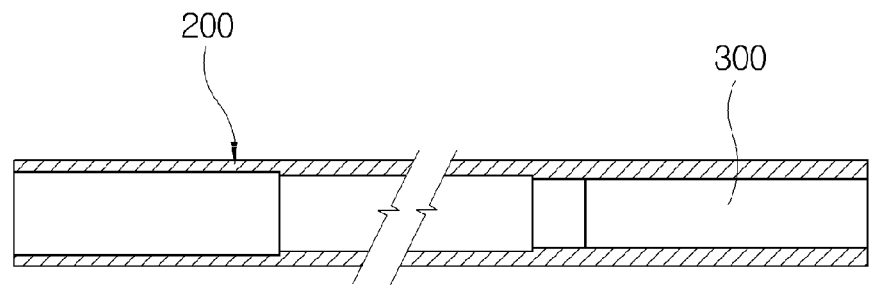

Meanwhile, as illustrated in FIGS. 11 and 12 which shows another exemplary embodiment of the present invention, the outer tubes 200 are formed in a structure wherein the inner diameter gradually decreases or step by step in the direction from one end to the other end. Namely, the flesh thickness of the outer tube 200 gradually or step by step gets thicker from one end to the other end.

As illustrated in FIG. 11, the outer diameter of the outer tube 200 is uniform from one end to the other end, but the inner diameter thereof may gradually decreases. As illustrated in FIG. 12, the outer tube 200 may be configured in such a way that the outer diameter thereof may same in the direction of one end, but the inner diameter thereof may gradually decrease. In the inner tube 300 which applies to the outer tube 200 according to further another embodiment of the present invention, the flesh thickness may same from one end to the other end or may gradually or step by step decrease or increase.

The inner tube 300 according to an exemplary embodiment of the present invention may apply to all of the top tube 110, the bottom tube 120 and the seat tube 130 forming the body frame 100 or may apply to any one or two or more than two tubes.

As described above, the tubes 110, 120 and 13 of the body frame 100 are made of carbon materials, and the outer diameters at the front end and the rear end (top and bottom) are same, and the body frame may be made thinner same as the conventional classical type bicycle wherein the body frame is made of metallic pipes. In particular, since the tubes forming the body frame 100 are made thinner, the inner tubes 300 may be installed in the section that has a strength problem since torsion stress concentrates on the section, thus reinforcing the weak sections.

The exemplary embodiments of the body frame for a bicycle according to the present invention so far have been described with reference to the accompanying drawings. It should be understood that these exemplary embodiments are included in the technical concepts of the claims of the present invention. In addition, these exemplary embodiments are provided for only illustrative purposes and should not be interpreted to limit the present invention when interpreting the claims of the present invention.

What is claimed is:

1. A body frame for a bicycle, which is manufactured in such a way that multiple carbon sheets are laminated to a predetermined thickness so that a head tube, a top tube, a bottom tube, and a seat tube are integrated, and the laminated structure is heated and pressurized together with an epoxy resin, comprising:

the top tube, the bottom tube and the seat tube having first, second, and third outer diameters, respectively, each of the first, second, and third outer diameters being constant along longitudinal directions of the top tube, the bottom tube and the seat tube, respectively, each of the first, second, and third outer diameters being in a range from 15 mm to 35 mm; and inner tubes made of a carbon material, the inner tubes being fixedly installed in a ¼ section with respect to a first direction from a front end to a rear end of the top tube, in a front ¼ section with respect to a second direction from a front end to a rear end of the bottom tube, and in a lower ¼ section with respect to a third direction from a bottom end to a top end of the seat tube, respectively.

2. The frame of claim 1, wherein an inner diameter of each of the top tube, the bottom tube and the seat tube gradually or step by step decreases from one end to the other end where each inner tube is positioned.

3. The frame of claim 2, wherein the inner tubes are each formed in the shape of a circular pipe and outer diameters of the inner tubes installed in the ¼ section of the top tube, the front ¼ section of the bottom tube, and the lower ¼ section of the seat tube correspond to inner diameters of the top tube, the bottom tube, and the seat tube, respectively.

4. The frame of claim 2, wherein the inner tubes are each formed of a plurality of circular pipes and an outer diameter of each of the circular pipes is smaller than the inner diameter of each of the top tube, the bottom tube and the seat tube.

5. The frame of claim 2, wherein the inner tubes are each formed in the shape of a polygonal pipe and vertexes of the polygonal pipe contact with an inner surface of each of the top tube, the bottom tube and the seat tube.

6. The frame of claim 1, wherein the inner tubes are each formed in the shape of a circular pipe and outer diameters of the inner tubes installed in the ¼ section of the top tube, the front ¼ section of the bottom tube, and the lower ¼ section of the seat tube correspond to inner diameters of the top tube, the bottom tube, and the seat tube, respectively.

7. The frame of claim 1, wherein the inner tubes are each formed of a plurality of circular pipes and an outer diameter of each of the circular pipes is smaller than an inner diameter of each of the top tube, the bottom tube and the seat tube.

8. The frame of claim 1, wherein the inner tubes are each formed in the shape of a polygonal pipe and vertexes of the polygonal pipe contact with an inner surface of each of the top tube, the bottom tube and the seat tube.

9. The frame of claim 1, wherein the first, second, and third outer diameters of the top tube, the bottom tube, and the seat tube are substantially the same.

10. A body frame for a bicycle comprising:
a top tube having a first outer diameter, a bottom tube having a second outer diameter, and a seat tube having a third outer diameter, the first, second, and third outer diameters being each constant along longitudinal directions of the top tube, the bottom tube, and the seat tube, respectively, each of the first, second, and third outer diameters being in a range from 15mm to 35mm; and
first, second, and third inner tubes made of a carbon material, the first inner tube being disposed in a front ¼ section of the top tube, the second inner tube being disposed in a front ¼ section of the bottom tube, the third inner tube being disposed in a bottom ¼ section of the seat tube, the front ¼ section of the top tube being coupled to the front ¼ portion of the bottom tube, the bottom ¼ section of the seat tube being coupled to the a rear ¼ portion of the bottom tube, the rear ¼ portion of the bottom tube being located opposite to the front ¼ portion of the bottom tube in the longitudinal direction of the bottom tube.

11. The frame of claim 10, wherein each of the inner diameters of the top tube, the bottom tube, and the seat tube gradually or step by step decreases from one end portion to the other end portion of a corresponding one of the top tube, the bottom tube, and the seat tube, each of the first, second, and third inner tubes being positioned in a corresponding other end portion.

12. The frame of claim 11, wherein each of the first, second, and third inner tubes is a circular pipe, and
wherein outer diameters of the first, second, and third inner tubes correspond to inner diameters of the corresponding other end portions of the top tube, the bottom tube, and the seat tube, respectively.

13. The frame of claim 10, wherein each of the first, second, and third inner tubes is a circular pipe, and
wherein outer diameters of the first, second, and third inner tubes correspond to inner diameters of the top tube, the bottom tube, and the seat tube, respectively.

14. The frame of claim 10, wherein the first, second, and third outer diameters of the top tube, the bottom tube, and the seat tube are substantially the same.

15. The frame of claim 10, wherein each of inner diameters of the top tube, the bottom tube, and the seat tube monotonically decreases from one end portion to the other end portion of a corresponding one of the top tube, the bottom tube, and the seat tube, each of the first, second, and third inner tubes being positioned in a corresponding other end portion.

* * * * *